Sept. 24, 1974

P. A. HOCHSTEIN 3,838,142

PROCEDURE FOR CORRECTING RADIAL FORCE
VARIATIONS IN PNEUMATIC TIRES
Filed April 23, 1973

United States Patent Office 3,838,142
Patented Sept. 24, 1974

3,838,142
PROCEDURE FOR CORRECTING RADIAL FORCE VARIATIONS IN PNEUMATIC TIRES
Peter A. Hochstein, Sterling Heights, Mich., assignor to General Motors Corporation, Detroit, Mich.
Filed Apr. 23, 1973, Ser. No. 353,234
Int. Cl. B29c 15/00, 17/07, 23/00; B29h 5/02, 17/02
U.S. Cl. 264—94
5 Claims

ABSTRACT OF THE DISCLOSURE

A procedure for correcting radial force variations in pneumatic tires of the type having a body portion of polymeric material defining a pair of circular sidewalls interconnected by a tread body, the procedure including the steps of rotating the inflated pneumatic tire while subjecting the latter to a normal operating load, continuously monitoring the magnitude of the reaction force resisting the applied load to determine the magnitude and location of the maximum reaction force, and subjecting selected sections of the tire sidewalls and/or tread body to ionizing radiation to increase the modulus of elasticity of the irradiated sections. The sections to be irradiated are those corresponding to instantaneous reaction force magnitudes not exceeding a predetermined portion of the maximum reaction force magnitude achieved through 360° of tire rotation.

---

Figure 1:
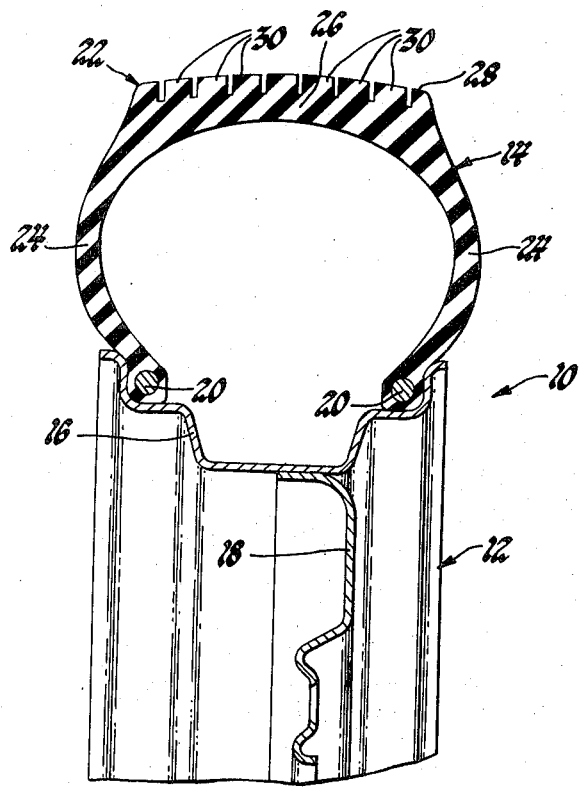

This invention relates generally to pneumatic tires and more particularly to an improved method for correcting radial force variations generated thereby.

Radial force variation, a term familiar to those skilled in the automotive suspension art and the pneumatic tire art, describes the phenomenon which occurs when a vehicle mounted pneumatic tire with non-constant sidewall and/or tread body resilience rolls over a road surface. More particularly, if a particular pneumatic tire has one or more sidewall and/or tread body sections which are less flexible or less resilient than the rest, each time those less resilient sections are instantaneously disposed directly between the road contact patch of tire and the wheel spindle or axle the magnitude of the radially directed force experienced by the spindle or axle momentarily increases. The explanation for this, of course, is based on the fact that the tire sidewalls and tread body normally function as substantially constant rate springs between the wheel spindle and the road surface tending to help maintain the spindle at a constant height above the road surface. When a higher rate spring; i.e., a sidewall or tread body section of less resilience, is momentarily interposed between the spindle or axle and the road surface, a momentary force reaction of increased magnitude is generated at the spindle or axle, the amount of the increase being the radial force variation.

It is, of course, desirable to maintain the radial force variations generated by a particular pneumatic tire within acceptable limits. One procedure for accomplishing this involves the removal of tire tread material adjacent the less resilient sections. Another procedure by which the same result is achieved involves weights which are placed on the wheel to counterbalance the radial force variations, the location and size of the weights being determined by "balancing" the tire and wheel assembly under load. A radial force variation correction procedure according to this invention is an improvement over these heretofore known procedures for minimizing radial force variations.

Figure 2:
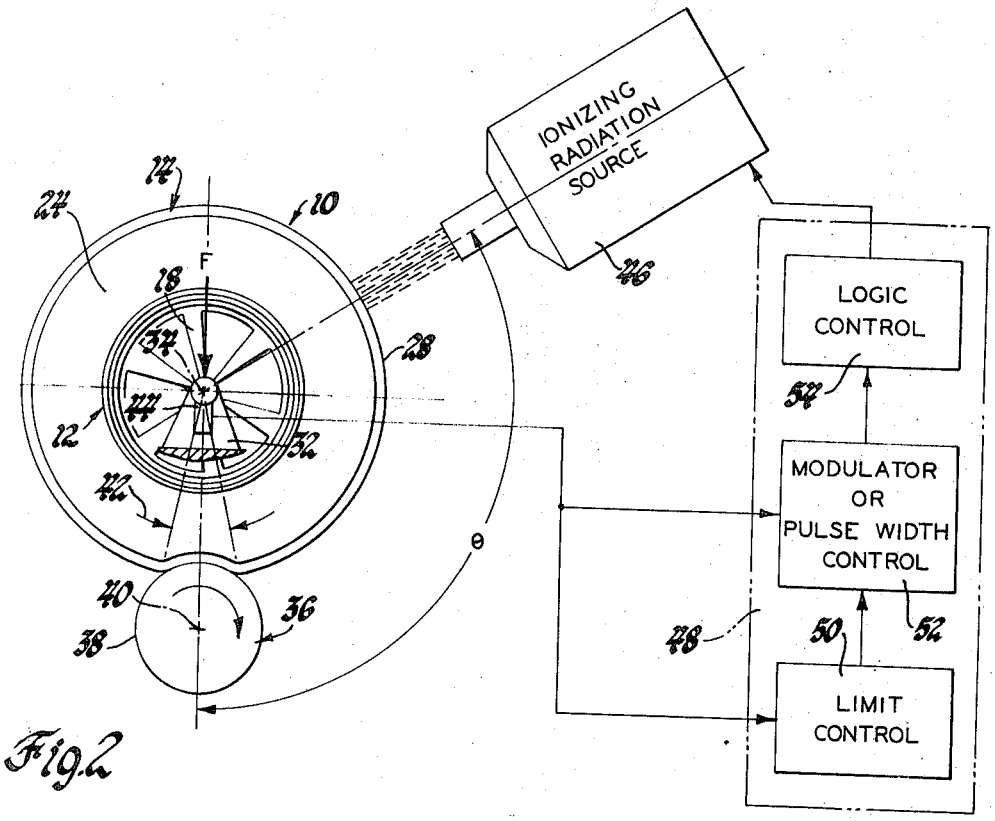

The primary feature, then, of this invention is that it provides an improved procedure for maintaining radial force variations of pneumatic tires within acceptable limits. Another feature of this invention is that it provides an improved radial force variation correction procedure which requires neither removal of tire tread material nor the addition of external counterbalance weights. Yet another feature of this invention is that it provides an improved radial force variation correction procedure wherein the modulus of elasticity of selected sections of the tread body and/or sidewalls of the tire are altered to reduce the resilience of the selected sections. A further feature of this invention resides in the use of the improved procedure of ionizing radiation directed at the selected tread body and/or sidewall sections, the ionizing radiation functioning to effect further cross-linking of the molecules of the irradiated sections with consequent effective modulus of elasticity increase. These and other features of this invention will be readily apparent from the following specification and from the drawings wherein:

FIG. 1 is a transverse cross-sectional view of a portion of a typical pneumatic tire and wheel assembly; and FIG. 2 is a schematic diagram depicting typical apparatus for implementing the improved radial force variation correction procedure according to this invention.

Referring now to FIG. 1 of the drawings, a typical pneumatic tire-wheel assembly designated generally 10 includes a wheel 12 and a pneumatic tire 14. The wheel 12 includes a rim 16 and a web 18 adapted for attachment to a mounting structure. The tire 14 is of typical bias ply construction or radial ply construction and includes a carcass, not shown, composed of a plurality of cord plies extending between a pair of circular reinforcing members 20, the cords being oriented radially or at predetermined angles. The tire further includes a body portion 22 of polymeric material, as for example styrene-butadiene rubber commonly called SBR, molded about the carcass. The body portion 22 includes a pair of circular sidewalls 24 interconnected by a relatively thick tread body 26 defining a generally cylindrical tread surface 28 having a plurality of individual treads 30. There may, of course, be one or more cylindrical belts, not shown, embedded in the polymeric material and disposed between the carcass and the tread surface 28.

The SBR or other molded polymeric material from which the body portion 22 is fabricated is the end product of a conventional curing or vulcanizing procedure to which a monomeric material is subjected, the curing procedure effecting cross-linking of the molecules of the monomer to produce a polymeric material having a predetermined modulus of elasticity. However, in the cured tire the cross-linking of the molecules of the monomer is not fully complete so that the modulus of elasticity of the cured polymeric material remains subject to change through further molecular cross-linking.

When the tire-wheel assembly 10 is mounted on a vehicle resting on a road surface, radially directed force reactions are generated at the wheel spindle or axle and at the portion of the tread surface 28, commonly called the contact patch, in contact with the road surface which reactions tend to compress the tire between the wheel and the contact patch. This compression is resisted by the pressurized gas within the tire and by the radial section including the sidewalls and the tread body disposed directly between the contact patch and the wheel spindle. Due to manufacturing inconsistencies, the resilience of the sidewalls 24 and/or the tread body may vary around the tire, these variations resulting in corresponding variations in the magnitude of the radially directed force reactions experienced at the wheel spindle and the contact patch. It is these side resiliency variations which generate the radial force variations. A radial force variation correction procedure according to this invention operates to maintain the radial force variations within acceptable limits.

Referring now to FIG. 2 and describing typical apparatus for implementing the procedure according to this invention, the tire-wheel assembly 10 is supported by a spindle arrangement 32 on a relatively fixed mounting structure, not shown, for rotation about an axis 34 defined by the mounting structure, the axis 34 intersecting the geometric center of the tire and being oriented perpendicular to the plane of the latter. A load drum 36 having an outer cylindrical surface 38 is rotatably supported by conventional means, not shown, on the mounting structure and is adapted to be mechanically driven in one or the other directions of rotation about an axis 40 parallel to the axis 34. The axis 40 is adapted for radial translation relative to the axis 34 so that the outside cylindrical surface 38 of the load drum can be forced against the tread surface 28 of the tire for simulating a normal load on the latter while simultaneously causing the tire to rotate about the axis 34 in response to rotation of the load drum, the area of contact between the drum and the tire being generally equivalent to the road contact patch. By thus rotating the tire under load, successive radial sections of the side walls 24 and tread body can be flexed in a controlled environment, a typical radial section under instantaneous flexure being indicated at 42 in FIG. 2.

The force applied to the tire at the tread surface 28 by the load drum 36 is resisted by the spindle arrangement 32 whereat a radially directed reaction force indicated by the force vector F is generated. The spindle arrangement includes a conventional force transducer designated generally 44, such as a load cell or the like, which monitors the instantaneous magnitude of the reaction force F. Alternately, the displacement of the axis 40 of the load drum 36 could be montioned through a conventional displacement transducer, not shown. A source of ionizing radiation designated generally 46 is disposed adjacent the tire 14 and is connected to the force transducer 44 or the displacement transducer through a control circuit arrangement designated 48. The details of the various elements of the control circuit arrangement 48 need not be elaborated since they form no part of this invention and since the functional recitation appearing hereinafter will immediately suggest to those skilled in the art commercially available components for performing the recited functions.

In the preferred embodiment, the ionizing radiation source 46 is adapted to emit a stream of high energy or highly accelerated electrons. Such a source might, for example, be a linear accelerator, a Van de Graaff Generator, or a field emission generator. The source 46 may be of the type which emits a continuous stream of highly accelerated electrons, in which case the source includes provision for modulating the intensity of the stream, or it may be of the type which emits a stream of highly accelerated electrons in pulses, in which case the source includes provision for controlling the time duration or width of each pulse. As is more fully explained hereinafter, the source 46 is angularly spaced from the contact patch by an included angle $\theta$ and the electron stream emitted impinges on the tread body or the side walls 24 or both.

Referring again to FIG. 2, the control circuit arrangement 48 includes a limit control component 50 and a modulator or pulse width control component 52. The output of the force transducer 44 or the displacement transducer is transmitted to both the limit control 50, which determines whether the source should or should not be actuated, and to the modulator or pulse width control 52 which determines the extent to which the source 46 is actuated. The control circuit arrangement further includes a logic control component 54 disposed between the modulator or pulse width control 52 and the source 46, the logic control being adapted to monitor the angular velocity of the tire 14 for delaying the actuation of the source 46 by a time duration sufficient to insure alignment of the electron stream and selected sections of the tread body and/or sidewalls 24.

Before implementing the radial force variation correction procedure according to this invention it is necessary to determine a range of radial force variation magnitudes which are amenable to correction. That is, if the resilience of the sidewalls and/or tread body varies only slightly around a particular tire, the radial force variations which result will be acceptable so that further correction is unnecessary. Conversely, if the resilience of the sidewalls and/or tread body varies substantially, no reasonable amount of correction can be expected to reduce the radial force variation to an acceptable level so that in this situation no correction is attempted and the tire is discarded. Between these two extremes lies a correctable range of radial force variation. For example, for passenger vehicle tires radial force variations of magnitudes between about 10 lbs. and 30 lbs. are considered correctable. That is, if the magnitude of the maximum radial force variation does not exceed 10 lbs. the tire is acceptable without correction and if the maximum magnitude exceeds 30 lbs. the tire is discarded without correction. If the maximum magnitude is between 10 and 30 lbs., the radial force variation correction procedure according to this invention is implemented to reduce the maximum magnitude to an acceptable level, as for example 10 lbs.

Describing now the steps in the correction procedure according to this invention, the pneumatic tire 14 is mounted on the wheel 12 and inflated to normal operating pressure. The tire-wheel assembly is then supported on the spindle arrangement 32 for rotation about the axis 34 and the load drum moved toward the tire to effect engagement between the surface 38 of the former and the tread surface 28 of the latter. The load drum is moved toward the tire until the force exerted on the tread surface generates a radially directed reaction force F at the spindle arrangement generally equal to the typical reaction force generated at the wheel spindle or axle of a vehicle, the magnitude of the force F being monitored by the force transducer 44. Once the desired force level is achieved, the load drum is caused to rotate about the axis 40 thereby to effect concurrent rotation of the tire-wheel assembly about the axis 34.

As the assembly 10 rotates, successive radial sidewall sections 42 and tread body sections are directly interposed between the contact patch and the axis 34. As noted hereinbefore, any variation in sidewall and/or tread body resilience will result in a corresponding variation in the magnitude of the reaction force F which is continuously monitored by the transducer 44. Assuming that the limit control 50 has been programmed to initiate the correction procedure if the magnitude of the maximum radial force variation is between 10 and 30 lbs., the tire and wheel assembly is rotated through a first 360° cycle during which the instantaneous magnitude of the force reaction F is transmitted to the limit control 50 and the modulator or pulse width control 52. If the magnitude of the maximum radial force variation is in the range of 10 to 30 lbs., the limit control renders the modulator or pulse width control 52 operative to continue the procedure. If the maximum magnitude of the force variation does not fall within the prescribed limits, the limit control 50 merely signals that the tire 14 is acceptable or unacceptable.

Assuming the maximum magnitude of the radial force variation encountered during the first 360° of rotation is between 10 and 30 lbs., that maximum magnitude is stored in the modulator or pulse width control 52 to be used as a reference during succeeding steps in the correction procedure. As the tire-wheel assembly 10 continues to rotate beyond the first 360° cycle, the instantaneous magnitude of the force reaction F is continuously transmitted to the modulator or pulse width control 52 wherein it is continuously compared with the reference magnitude. Whenever the reference magnitude exceeds the instantaneous magnitude by more than 10 lbs., the modulator or pulse width control 52 functions to trigger or actuate the source 46. The triggering signal, however, is delayed by the logic control 54 until the wheel-tire assembly 10 has rotated through an included angle equal to θ whereupon the source 46 is actuated to emit a stream of highly accelerated electrons which impinge on the selected tread body and/or sidewall radial sections.

As recited hereinbefore, when a polymeric material such as cured SBR is subjected to such ionizing radiation, further molecular cross-linking occurs and the modulus of elasticity of the material is increased. Accordingly, as the various selected sidewall and/or tread body sections are irradiated the modulus of elasticity of those sections is increased so that the magnitudes of the next succeeding reaction forces F generated by those irradiated sections when disposed directly between the contact patch and the axis 34 are similarly increased and the radial force variation correspondingly reduced. When working with SBR, it has been found that an electron stream produced by a linear accelerator operating at a potential of 1.5 million electron volts has sufficient energy to penetrate the SBR and to effect the desired cross-linking to a depth of approximately .20 inch.

During each succeeding revolution of the tire-wheel assembly 10, the source 46 continues to irradiate those radial sections of the tread body and/or side walls 24 which produce instantaneous reaction forces F of magnitude at least 10 lbs. less than the reference magnitude. When the difference between the reference magnitude and each instantaneous reaction force magnitude generated through 360° of tire-wheel assembly rotation does not exceed 10 lbs. the correction procedure is complete and the apparatus deactivated and prepared for another duty cycle with another tire-wheel assembly. The result of the correction procedure according to this invention, then, is a tire-wheel assembly which produces radial force variations within an acceptable limit and which can be expected to perform satisfactorily on a vehicle.

Those skilled in the pneumatic tire and automotive suspension arts can appreciate, of course, that the particular construction of a tire will have some bearing on whether radial force variation can be most efficiently corrected by increasing the modulus of elasticity of the sidewalls, the tread body or both. Accordingly, the source 46 is to be adapted for irradiating either the sidewalls or the tread body individually or both together.

Having thus described the invention, what is claimed is:

1. In combination with a procedure for monitoring the radial force variation characteristics of a pneumatic tire having a body portion of polymeric material defining a pair of flexible sidewalls and an interconnecting tread body including the steps of supporting said tire in an inflated condition for rotation about an axis intersecting generally the center of said tire and oriented perpendicular to the plane of the latter, rotating said tire about said axis at a predetermined angular velocity, applying a force on said tread body directed through said axis of magnitude sufficient to flex said sidewalls, and monitoring the instantaneous magnitude of the reaction force resisting said applied force and the corresponding radial section of said body portion instantaneously disposed between said applied force and said axis, the improvement comprising the step exposing at least a portion of said radial sections of said body portion corresponding to an instantaneous magnitude of said reaction force not exceeding a predetermined reference magnitude to ionizing radiation for effecting further cross-linking of the molecules of said polymeric material thereby to increase the modulus of elasticity of said polymeric material so that instantaneous magnitude of said reaction force through 360° of tire rotation at least equals said reference magnitude.

2. The improvement recited in claim 1 wherein said reference magnitude equals a predetermined portion of the maximum instantaneous magnitude of said reaction force achieved during 360° of rotation of said tire.

3. The improvement recited in claim 1 wherein said ionizing radiation comprises a stream of highly accelerated electrons.

4. The improvement recited in claim 3 wherein said stream of highly accelerated electrons is directed only at said tread body of said tire body portion.

5. The improvement recited in claim 3 wherein said stream of highly accelerated electrons is directed only at said sidewalls of said tire body portion.

References Cited

UNITED STATES PATENTS

| | | | |
|---|---|---|---|
| 3,529,048 | 8/1968 | Kovac et al. | 264—94 |
| 3,632,701 | 1/1972 | Devitt et al. | 264—40 |
| 3,635,610 | 1/1972 | Hall et al. | 264—94 |

MURRAY TILLMAN, Primary Examiner

T. K. PAGE, Assistant Examiner

U.S. Cl. X.R.

156—110; 204—159.22; 264—22, 40, 100